United States Patent
Bansal et al.

(10) Patent No.: US 8,275,957 B2
(45) Date of Patent: Sep. 25, 2012

(54) SYSTEM AND METHOD FOR OPTIMIZING DATA IN VALUE-BASED STORAGE SYSTEM

(75) Inventors: Nikhil Bansal, Yorktown Heights, NY (US); Frederick Douglis, Basking Ridge, NJ (US); Lisa Karen Fleischer, Ossining, NY (US); Kirsten Weale Hildrum, Hawthorne, NY (US); Akshay Kumar Reddy Katta, New York, NY (US); John Davis Palmer, San Jose, CA (US); Elizabeth Suzanne Richards, Columbia, MD (US); David Tao, Glen Burnie, MD (US); William Harold Tetzlaff, Mount Kisco, NY (US); Joel Leonard Wolf, Katonah, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 12/061,879

(22) Filed: Apr. 3, 2008

(65) Prior Publication Data
US 2008/0189494 A1 Aug. 7, 2008

Related U.S. Application Data

(63) Continuation of application No. 11/376,322, filed on Mar. 16, 2006, now abandoned.

(51) Int. Cl.
G06F 12/00 (2006.01)
G06F 13/00 (2006.01)
G06F 13/28 (2006.01)
(52) U.S. Cl. .......... 711/159; 711/112; 711/171; 707/662
(58) Field of Classification Search ................... 711/159
See application file for complete search history.

(56) References Cited

U.S. PATENT DOCUMENTS

| | | | |
|---|---|---|---|
| 5,732,265 A * | 3/1998 | Dewitt et al. ................. | 707/200 |
| 7,200,626 B1 * | 4/2007 | Hoang et al. .................. | 707/204 |
| 2005/0050268 A1 * | 3/2005 | Yoshida ........................ | 711/114 |
| 2006/0072400 A1 * | 4/2006 | Anderson et al. ............ | 369/47.1 |
| 2006/0075007 A1 * | 4/2006 | Anderson et al. ............. | 707/206 |
| 2006/0101095 A1 * | 5/2006 | Episale et al. ................. | 707/204 |
| 2006/0288047 A1 * | 12/2006 | Chron et al. .................. | 707/200 |

OTHER PUBLICATIONS

F. Douglis, J. Palmer, E.S. Richards, D. Tao, W.H. Tetzlaff, J.M. Tracey, J. Yin, "Position: Short Object Lifetime Require a Delete-Optimized Storage", IBM Research Centers and U.S Department of Defense, 2004.
L.W. Dowdy and D.V. Foster, "Comparative Models of the File Assignment Problem", Computing Surveys, vol. 14, No. 2, Jun. 1982.

* cited by examiner

*Primary Examiner* — Kevin Ellis
*Assistant Examiner* — Prasith Thammavong
(74) *Attorney, Agent, or Firm* — McGinn IP Law Group, PLLC

(57) ABSTRACT

A method (and system) of storing data in a value-based storage system, includes optimizing a value of data stored in the value-based storage system.

14 Claims, 6 Drawing Sheets

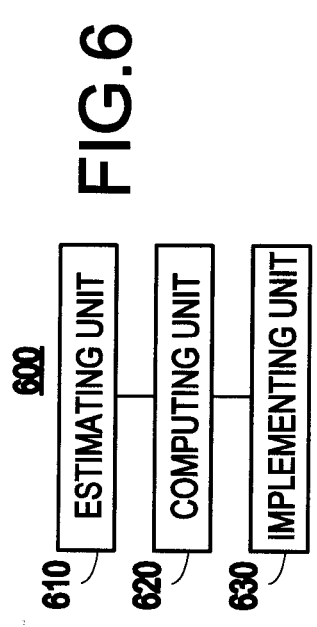
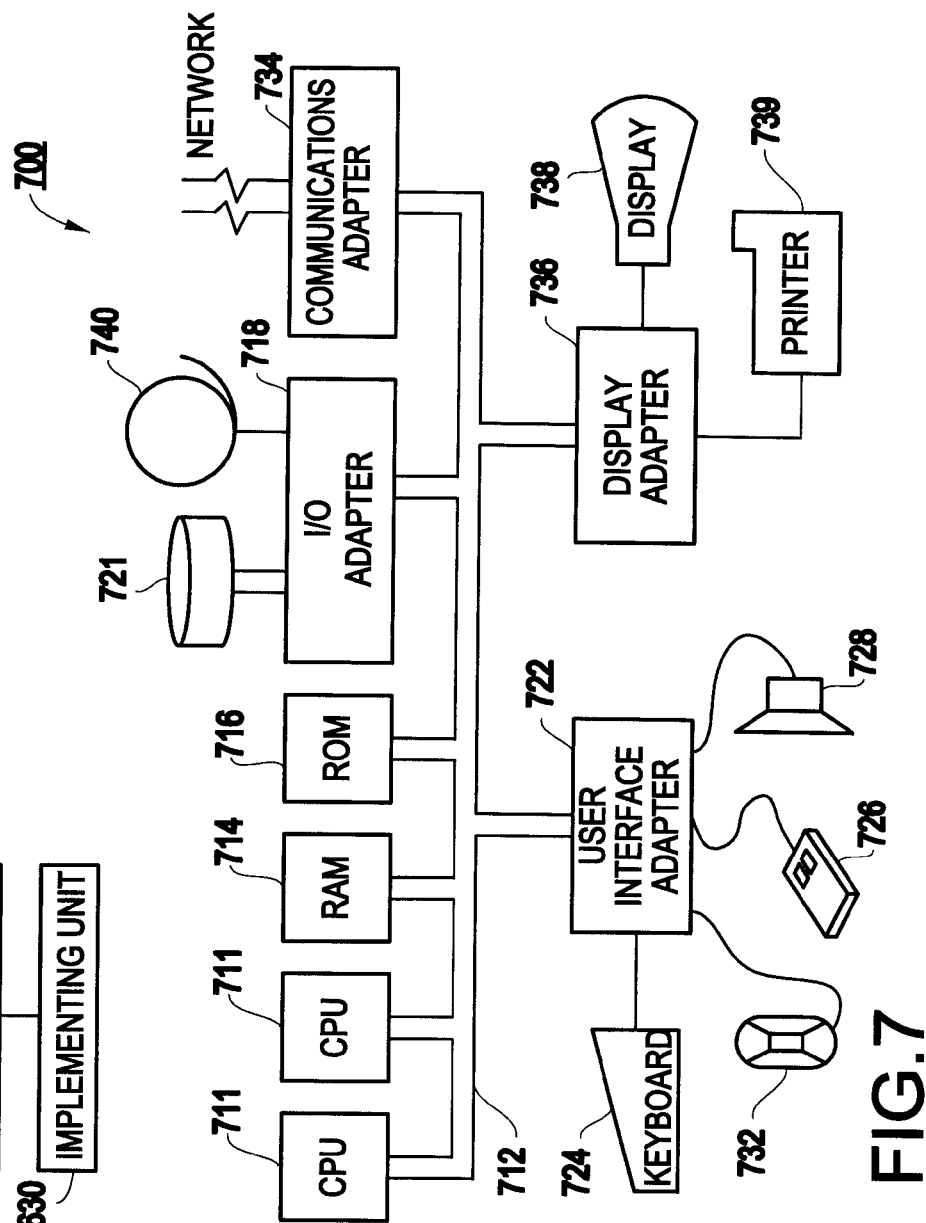
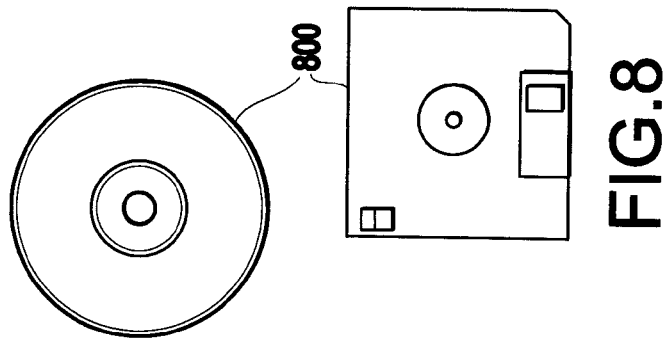

SYSTEM AND METHOD FOR OPTIMIZING DATA IN VALUE-BASED STORAGE SYSTEM

The present application is a Continuation Application of U.S. patent application Ser. No. 11/376,322 filed on Mar. 16, 2006 now abandoned.

GOVERNMENT RIGHTS

This invention was made with Government support under Contract No.: H98230-04-3-001 awarded by the U.S. Dept. of Defense. The Government has certain rights in this invention.

BACKGROUND OF THE INVENTION

1. Field of the Invention

The present invention generally relates to a method and apparatus for optimizing storage in a stream-based distributed computer system, and more particularly to a method and apparatus for maximizing the value of retained data in a storage system incorporating retention function-based data detection.

2. Description of the Related Art

Computer storage systems for storing inputted data are commonly known. However, not all commonly known computer data storage systems are designed to handle streaming data applications. Distributed computer systems, which for purposes of the present application refer to storage systems including multiple storage units (e.g., "vats") that are coupled together, have been specifically designed to handle streaming data applications. However, distributed computer systems designed to handle very large-scale (e.g., on the scale of hundreds of thousands of incoming streams of data) are in their infancy.

Highly scalable distributed computer systems that may handle complex applications involving large quantities of streaming data are possible. In particular, distributed computer systems, including tens of thousands of processing nodes, may have the capability of concurrently supporting hundreds of thousands of incoming and derived data streams and having storage subsystems with a capacity of multiple petabytes.

Even at these large sizes (e.g., a storage capacity of multiple petabytes), the distributed computer systems will not be able to handle all of the streaming data. That is, the processors cannot handle all of the streaming data and will be fully utilized. Additionally, the offered load will far exceed the processing power capabilities of the systems and the storage systems will be over capacity.

FIG. 1 depicts a conventional distributed storage subsystem 100 for a streaming data system described above. Incoming and derived streams 102 of data are processed by interconnected applications on a distributed set 104 of processing nodes 106a-106c. These processing nodes 106a-106c are interconnected via a network 108, and connected, via a storage network, to a collection 110 of storage vats 112a-112c. Each vat 112a-112s may include an individual file system.

Storing streaming data presents a challenge that is qualitatively different from that of conventional systems (i.e., systems including non-streaming input data), because of the huge quantities of primal (incoming) and processed data, which needs to be written to disk. The storage subsystem of a conventional computer system is typically configured with sufficient capacity to handle the data. Deletion of data is typically done manually. But in a streaming environment, massive amounts of data are being written constantly. No reasonable amount of storage will be able to keep up with the incoming and derived streaming data, and therefore very little of the data can be kept permanently. In fact, one can assume that in steady state, the storage subsystem will constantly be more or less fully allocated.

Thus, as new data arrives, an equivalent amount of old data must be flushed (deleted). Since the deletion operations will happen at great rates, they cannot be done manually (as is done in conventional systems). Given that a typical distributed computer system for steaming data applications will run continuously, there will be no 'down' time to fix problems. Therefore, any attempt to optimize the storage of the streaming data must be done in real time. Therefore, conventional storage techniques, where data is deleted manually, are not ideal for a streaming data system.

Stored data objects in streaming systems are typically regarded as immutable once created. Thus, the storage subsystem has the roles of handling initial writes, potentially multiple reads, and, finally, deletion of the data.

One solution to the automatic deletion of data might be to keep the most recent data, displacing the oldest data first. This is commonly known as the first in, first out (FIFO) approach. Another idea is to retain data based on the time of its last usage (initial write or subsequent read). This is commonly known as the least recently used (LRU) approach, effectively treating the entire storage subsystem as though it were a huge cache. Each of these techniques is a conventional technique that has been used in non-streaming data systems.

However, neither of these concepts will work well for streaming data applications, because these approaches do not optimize the value of data being retained.

Accordingly, there is a need for a more sophisticated approach. A conventional approach for handling streaming data has been developed that treats data differently based on its current importance to the overall system. For example, the headlines of news articles from CNN might be worth storing for longer periods of time than the actual body of the news articles.

The approach is to define for each data object to be written to disk a function describing its projected value over time (i.e., a so-called time value of information objects). This retention value function is typically non-increasing, within a range from 0 to 100, though neither of these properties is strictly required. The storage subsystem then deletes the data with the lowest current retention function values as space is needed. This design results in a relative rather than absolute notion of value. That is, the retention function value at a given time does not guarantee the amount of time the data object has left before being deleted. The overhead associated with such a deletion method is manageable, at least as long as the number of such functions is not too large.

The creation of the retention value functions is generally the responsibility of the application, and defined at a much coarser level than that of the data objects themselves. Each data object belongs to a so-called retention class. All data objects in a particular retention class have retention values determined by the same retention value function. Thus, retention classes are the atomic unit on which retention value functions are defined. Different data objects within a retention class can have varying ages, and therefore have different values at any given time.

Occasionally, it may be useful to modify a particular retention value function, or to remove certain data objects from a retention class and add them to another, thus changing the retention value functions for those objects. Storage class retention function assignments and data object retention value function modifications are the job of analytics, and these are orthogonal to the present embodiment.

The above-described technique has been used in an environment including a single storage unit (e.g., vat). In an individual vat, space is essentially fluid, and deleting existing data frees up space for a comparable amount of new data. As a practical implementation, one can approximate this flow balance concept via a waterline. The waterline is defined for a given vat and time, so that data whose value is below this waterline will be deleted. Data whose value is at or above this waterline will be retained. The waterline rises and falls over time, depending on the amount of new data that must be added to the vat.

However, the notion of waterlines takes on a much different character when there are multiple vats (e.g., as in the distributed storage system 100 depicted in FIG. 1). Absent a global optimization strategy, the waterlines of the various vats may drift and become quite different over time. This may result in the deletion of higher valued data than would be removed in a scenario with one global vat with a single waterline. It would therefore clearly be useful if the waterlines of the various vats were identical, or, more precisely, as close as possible to equal, given the other constraints in the system.

Therefore, it is clear that a novel and very effective optimization method is necessary for a storage component of a distributed computer system to handle large scale stream processing applications.

SUMMARY OF THE INVENTION

In view of the foregoing and other exemplary problems, drawbacks, and disadvantages of the conventional methods and structures, an exemplary feature of the present invention is to provide a method (and system) for optimizing storage in a stream-based distributed computer system by maximizing the value of retained data in the storage system.

It is another exemplary feature to minimize the total value of all data removed (e.g., deleted) from the storage system. In other words, it is an exemplary feature of the present invention to maximize the total value of data retained in the storage system.

In accordance with a first exemplary aspect of the present invention, a method (and system) of storing data in a value based storage system includes optimizing a value of stored data in the value based storage system. The value may be optimized by computing an optimal decision for allocating new data to at least one data vat in the storage system, deleting existing data from at least one data vat and for moving existing data from a first data vat to another data vat in the storage system.

In accordance with a second exemplary aspect of the present invention a signal-bearing medium tangibly embodies a program of machine-readable instructions executable by a digital processing apparatus to perform a method of storing data in a storage system, where the method includes optimizing a value of stored data in the storage system.

In accordance with a third exemplary aspect of the present invention a method for deploying computing infrastructure includes integrating computer-readable code into a computing system, wherein the computer readable code in combination with the computing system is capable of performing a method of storing data in a storage system, where the method of storing data in a storage system includes optimizing a value of stored data in the storage system.

In accordance with a fourth exemplary aspect of the present invention a system for storing data in a storage system includes an optimizing unit that optimizes a value of stored data in the storage system.

As indicated above, a distributed storage subsystem may be used in a computer system running a plurality of applications. Each application has a choice of one of the vats in the distributed storage system. The inventors have discovered that it is important to ensure, with minimal communication, that applications make decisions that are good for the system as a whole. To ensure that the applications make good decisions, periodically, the optimizer of the present invention will gather information about the data being written and the state of the storage system, and then instruct the applications to revise their choice of vats.

The problem of optimizing or balancing of the vats in the storage system is somewhat similar to traditional file assignment problems (FAPs). However, the large majority of FAPs have had the goal of trying to balance load across the storage subsystem. Balancing waterlines, as in certain exemplary embodiments of the present invention, instead presents a different challenge.

Traditional FAPs have generally made decisions about initial data placement and periodic data movement. Proper initial placement is relatively more critical in a streaming system such as described above. That is because data movement is less useful from a cost/benefit analysis perspective in a system as depicted in FIG. 1.

That is, data may only be read a few times before being deleted, so the overhead of movement is high relative to its expected utility. Furthermore, movement of data is simply more expensive in a distributed storage system. Thus, one is forced to make very careful initial placement decisions, and treat data movement as expensive (and consequently limited), or even prohibited. In accordance with one exemplary aspect of the present invention, the method should behave as well, or almost as well, when data movement is not allowed at all.

Therefore, in accordance with an aspect of the present invention, the method (and system) minimizes the total value of all data deleted, subject to reasonable and practical constraints, such as local and global movement constraints. Minimizing the total values of the deleted data is equivalent to maximizing the total values of the data retained. This may be achieved by making optimal decisions about where to write newly created data, and also how to move data around within the storage subsystem, provided such movement is within the limits allowed and justified.

Therefore, certain exemplary aspects of the present invention propose optimizing the value of stored data in a value-based storage system by estimating the rates and value functions of data object production during a fixed projected interval of time, computing optimal decisions for allocating new data to the vats and moving the existing data from one vat to another, and implementing the decisions in a dynamic fashion during a fixed interval of time. Periodically, information will be gathered about the data being written and the state of the storage system, and the decisions concerning the placement and deletion of data from the vats may be revised. Accordingly, the method will make decisions that are good for the system as a whole.

With the above and other unique and unobvious exemplary aspects of the present invention, it is possible to maximize the total value of data retained in the storage system by making optimal decisions concerning where to write newly created data, deleting existing data and how to relocate data within the storage system. Additionally, certain aspects of the present invention are directed to maintaining identical (or as close to identical as possible) waterlines in the plurality of vats in the distributed storage system.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 6 illustrates a block diagram of a system 600 for optimizing data in a value-based storage system in accordance with an exemplary embodiment of the present invention;

FIG. 7 illustrates a block diagram of the environment and configuration of an exemplary system 700 for incorporating the present invention; and FIG. 8 illustrates a storage medium 800 for storing steps of the program for optimizing data in a value-based storage system according to an exemplary embodiment of the present invention.

DETAILED DESCRIPTION OF EXEMPLARY EMBODIMENTS OF THE INVENTION

Figure 1:
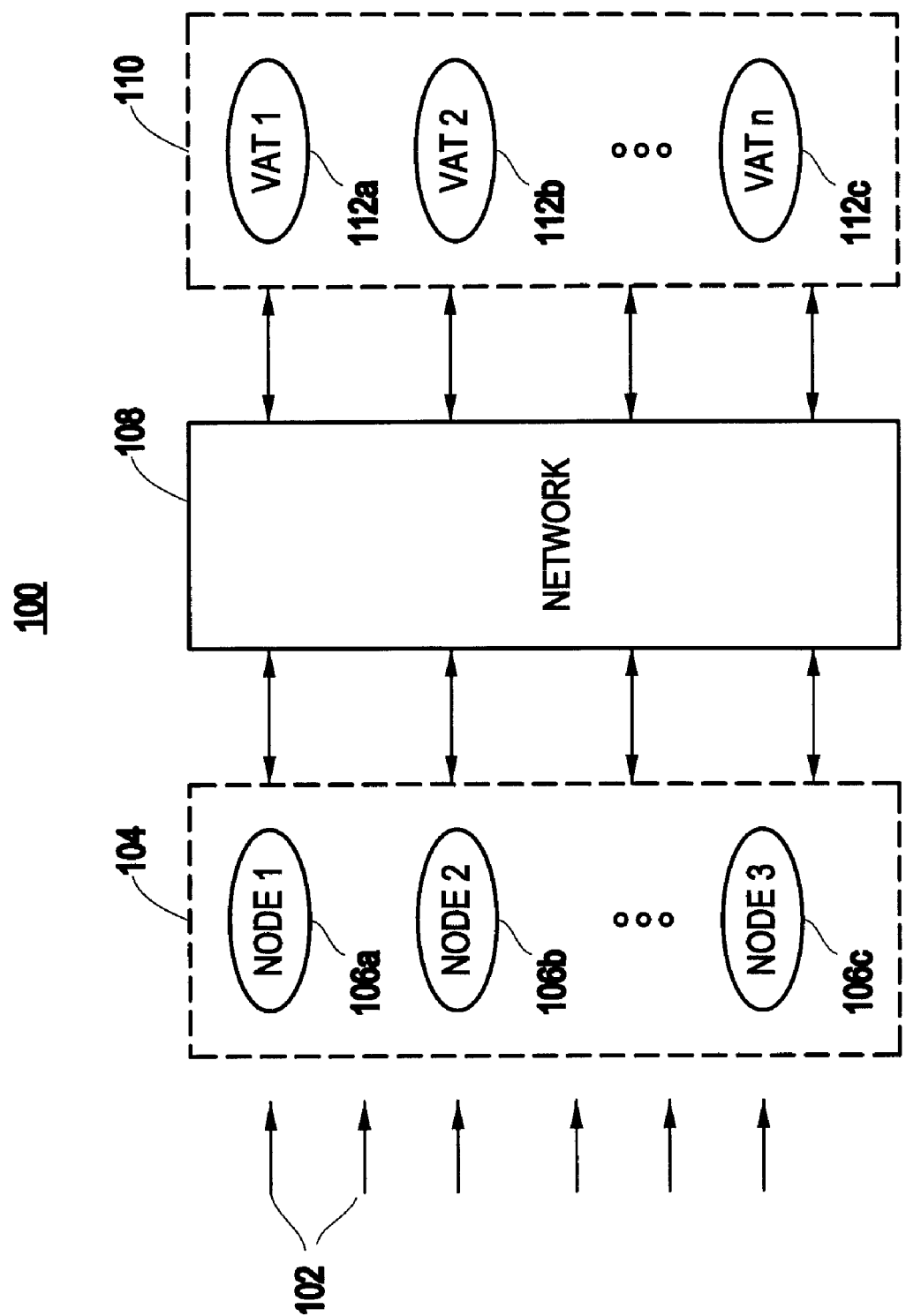
FIG. 1 illustrates a conceptual view of an exemplary conventional storage subsystem 100.

Referring now to the drawings, and more particularly to FIGS. 1-8, there are shown exemplary embodiments of the method and structures according to the present invention.

Prior to describing the method and system of the present invention, it is important to examine the constraints of the problem presented. The first constraint corresponds to a key rationale for the vats themselves. That is, different vats typically have different properties, and not all retention classes will be suitable for all vats.

For example, vats may have availability properties (e.g, redundant array of inexpensive discs (RAID) level) performance properties (e.g, nominal latency), security properties (e.g., some vats may be more secure than others), different locations in the distributed network (e.g., a distance metric might be appropriate) and qualitative properties (e.g., some vats might be reserved for DB2 data).

Each retention class may have specific requirements with respect to these properties, and thus be allowed only on a subset of the vats (The acceptable vats are those that meet all of the requirements). The optimization method allocates newly created data to a vat, which is acceptable. Furthermore, the optimization method may move existing data from one acceptable vat to another acceptable vat. In accordance with an exemplary embodiment of the present invention, the optimization method will only allocate newly created data and more existing data to an acceptable vat. Second, the optimization method obeys a variety of constraints describing (at either a local or a global level) the maximum amount of allowed movement. Finally, the method ensures than no vat receives too many requests for reads and writes.

In accordance with an exemplary aspect of the present invention, the optimization method (and system) requires minimal centralized control and direction. The method is epoch-based, gathering input, solving and implementing the computed solution entirely automatically. The exact length of an epoch is not crucial, as long as the length is sufficient to complete the optimization method. For example, an epoch may be fixed at a length of half-an-hour to one full hour.

Figure 2:
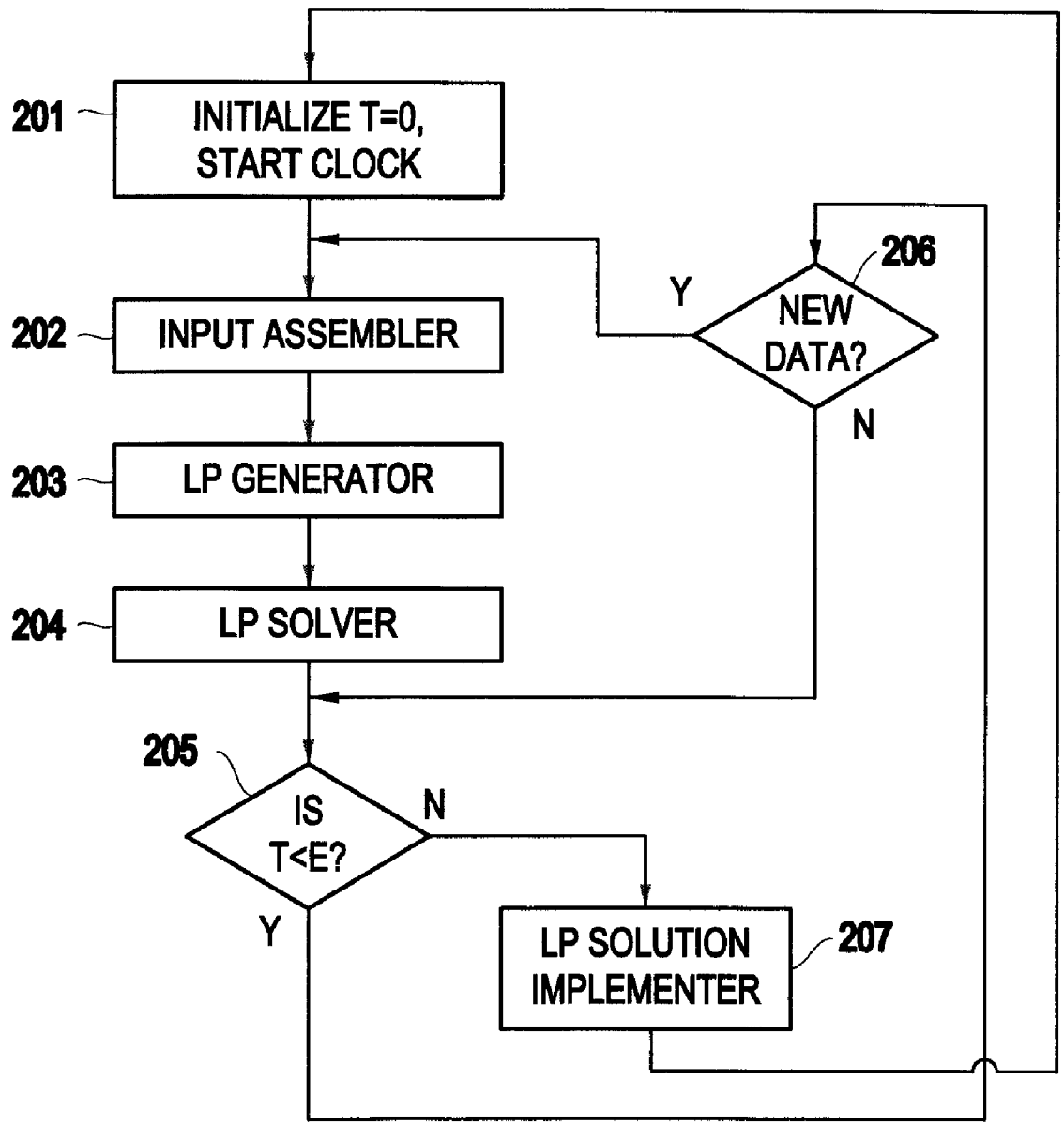
FIG. 2 illustrates a method 200 of optimizing data in a value-based storage system in accordance with an exemplary embodiment of the present invention.
Figure 3A:
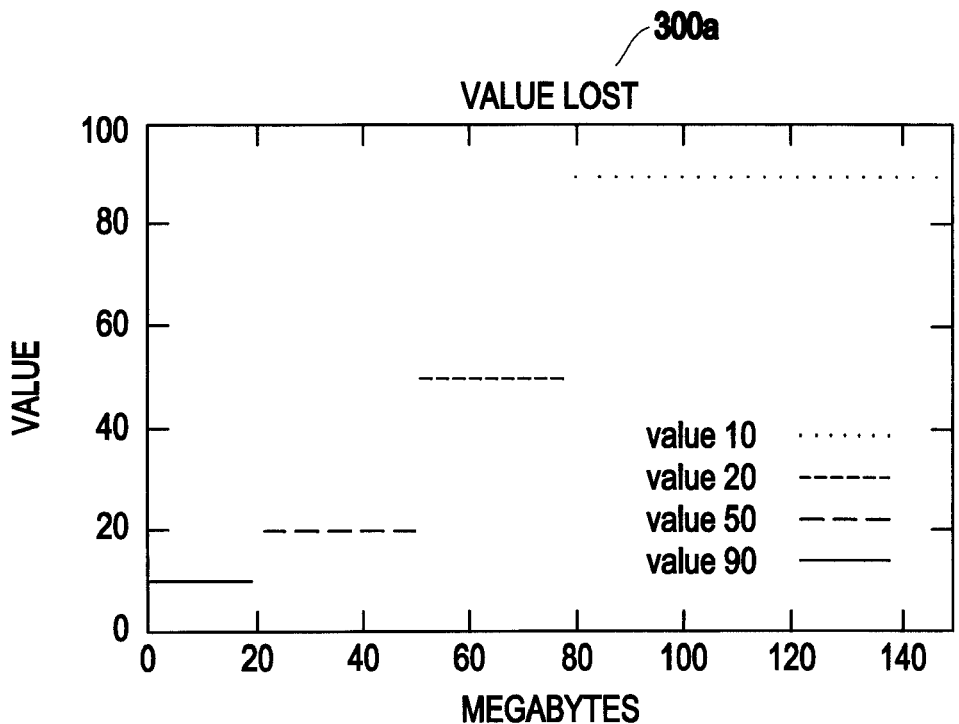
FIG. 3A depicts an example of a value function 300a for a retention class and vat in accordance with the exemplary embodiment illustrated in FIG. 2.
Figure 3B:
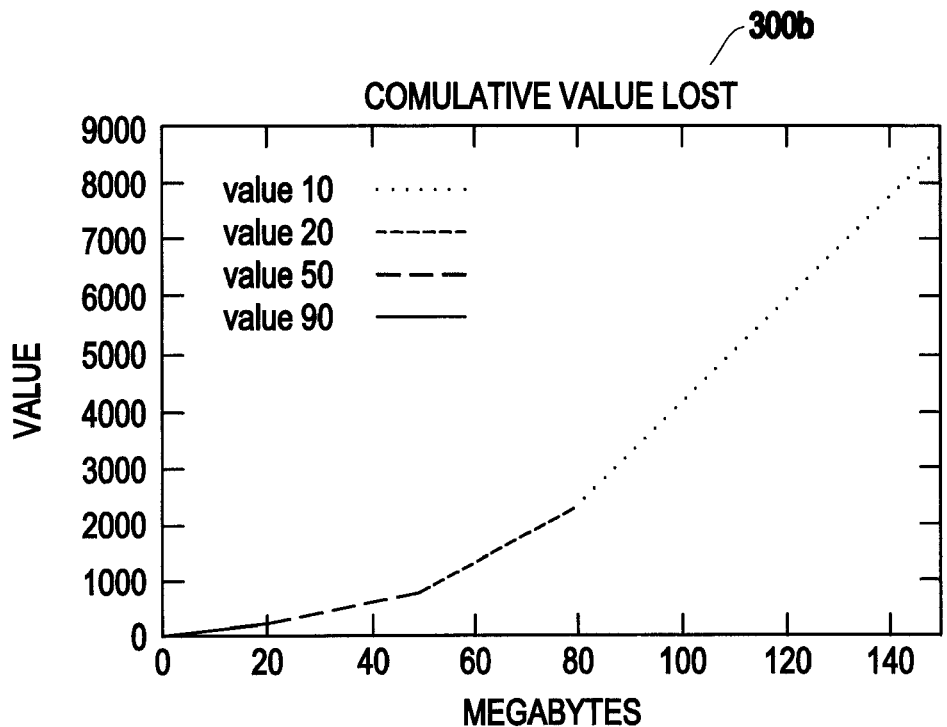
FIG. 3B depicts an example of a total value function 300b for a retention class and vat in accordance with the exemplary embodiment illustrated in FIG. 2.

FIG. 2 illustrates a method of storing data in a storage system according to an exemplary embodiment of the present invention. As indicated above, the optimization method is epoch-based, and the length of an epoch, say E, may be chosen by the system administrator.

During each epoch, each of the following steps may be executed. The time T since the current epoch started is intialized to 0, and the clock starts (step 201). (Such timers are standardly available in computer systems). An input assembler or module then generates and assembles the input required for the method (step 202). The output is fed to a linear program (LP) assembler (step 203), which generates the specific instance of the LP employed in the method. The LP represents the optimization problem to be solved.

The LP is then solved (step 204) by any of a variety of commercially available LP solvers. The solution obtained in step 204 indicates which new data is input into each vat, which existing data is removed and retained in each vat, and which data is moved to another vat. Ideally, the amount of data added to a vat equals the amount of data removed from a vat, and the amount of existing data moved between the vats is minimized or eliminated. It is ideal to minimize or eliminate the amount of existing data that is moved from one vat to another vat because movement of data between vats incurs significant overhead and is therefore generally not practical.

Then, the amount of elapsed time T since the start of the current epoch is checked (step 205) to determine if it is less than E (the length of an epoch). If the amount of elapsed time T is less than E, then the method checks to see if refined or corrected input data has now become available (step 206). If no refined or corrected input data is now available, then the method again checks to determine if the amount of elapsed time T since the start of the current epoch is checked is less than E (e.g., by returning to step 205). If new refined or corrected data has become available, then the input assembler or module again generates and assembles the input required for the method (e.g., by returning to step 202), starting the process of creating a new LP solution with the changed input data.

If, however, the amount of time T is greater than or equal to E, then the method implements a solution for all retention classes and vats during the next epoch (step 207). Then, the method is automatically repeated.

To further understand the input generator module, consider a finite collection of M retention classes indexed by r. These retention classes may correspond to existing data on a disk, to new data being written to a disk, or to both. There is also a finite collection of N vats indexed by v. For ease of notation, an exemplary embodiment also employs a vat 0 corresponding to new data (e.g., data not yet assigned to an 'actual' vat).

Furthermore, $Z[r][v]$ represents the estimated amount (in bytes) of retention class r data in vat v. In particular, $Z[r][0]$ is the amount of new data in retention class r. $C[v]$ represents the capacity (in bytes) of vat v. A[r][v] represents 1 if the retention class r is allowed in vat v, and 0 otherwise. The M×(N+1) matrix A is called the "acceptability matrix". c[v][v'] represents the (per byte) cost of moving data from vat v to vat v'. k[v][v'] represents the maximum amount of data (in bytes) that can be moved in one epoch from vat v to vat v'. K represents the maximum amount of data (in bytes) that can be moved between vats in one epoch. d[r] represents the expected access rate for data in retention class r. D[v] represents the maximum access rate threshold for vat v. α is a number between 0 and 1, and will weight the degree to which waterline optimization matters relative to load balancing.

Z[r][v] and d[r] can be estimated based on the current state of the system, via any standard forecasting techniques. C[v] is a property (e.g., vat storage capacity) of the storage devices in vat v, and may be measured by the number of bytes. A[r][v] can be computed as the conjunction of the required criteria for retention class r based on the properties of vat r.

The computation of A[r][v] in an exemplary embodiment of the present invention involves checking the availability, performance, security, location and other qualitative requirements, and setting the acceptability matrix to be 1 if all constraints are met, 0 otherwise. The constants c[v][v'], k[v][v'], K and α are user.

For purposes of the present description of an exemplary embodiment of the present invention, it is assumed that all vats in the storage system are full. In most situations, all of the vats in the storage system will be full. However, it will be easily understood, by one skilled in the art, how to apply the method of the present invention to a storage system in which all of the vats are not completely full.

The method constructs a function V[r][v] for each retention class r and vat v. The independent variable of V[r][v] represents the amount of data (in bytes) from retention class r, which will be deleted from vat v to accommodate new or existing data entering the vat. (If v=0 it will represent new data that is deleted immediately, and never stored.) The dependent variable of V[r][v] represents the total value of the data deleted.

Because the bulk delete function removes data of smallest value, an exemplary embodiment of the invention starts by ordering the data in terms of increasing value per byte for each retention class r and vat v. This gives rise to a function W[r][v] defined as the value W[r][v](w) of the (last) object of data removed if a total of w bytes are deleted. W[r][v] is a step function with one step for each different value of data in the vat (this is exemplarily depicted in FIG. 3A).

The function V[r][v] is the integral of this function between 0 and w. Because of the nature of W[r][v], the function V[r][v] is an increasing and piecewise linear convex function of w (this is exemplarily depicted in FIG. 3B). This convexity is an important part of the current invention, because if the convexity is not present, the solution described need not be optimal.

Figure 4:
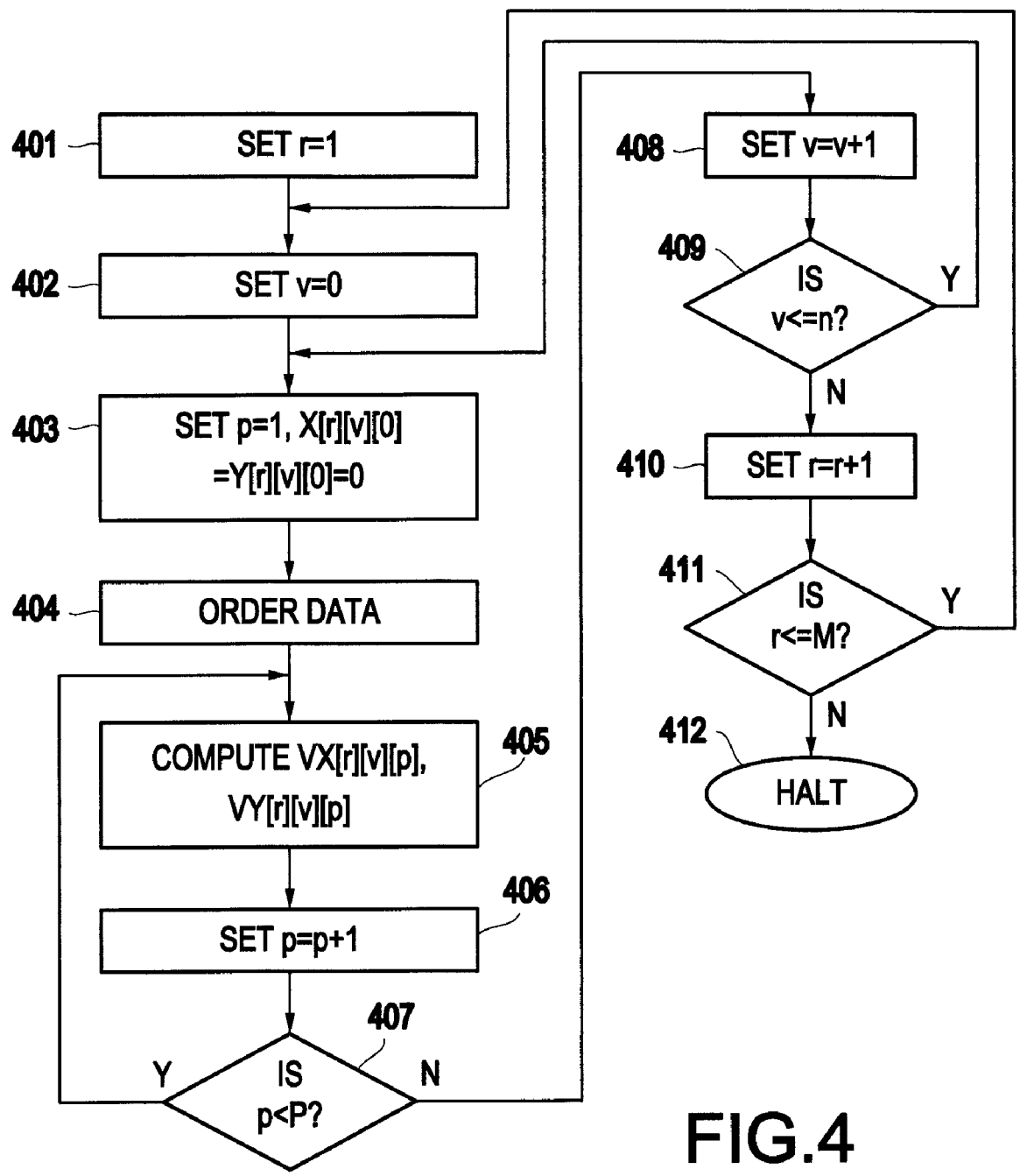
FIG. 4 illustrates an exemplary process 400 for computing the total value function 300b for a retention class and vat in accordance with the exemplary embodiment illustrated in FIG. 2.

FIG. 4 depicts a flowchart of the method of creation of the total value function V[r][v] for each retention class r and each vat v. First, r is set to 1 (step 401). Then, v is set to 0 (step 402). Next, p is set to 1, VX[r][v][0] and VY[r][v][0] are set to 0 (step 403). The data associated with the value function W is then ordered (step 404). The data is ordered in terms of the value, and can be sorted by any standard sorting scheme. Any known ordering technique may be used for ordering the data associated with the value function W. The output includes P[r][v] points (WX[r][v][1],WY[r][v][1]), . . . , (WX[r][v][P[r][v]],WY[r][v][P[r][v]]).

The value VX[r][v][p] is then computed as VX[r][v][p−1]+WX[r][v][p], and the value VY[r][v][p] is computed as VY[r][v][p−1]+WX[r][v][p]*WY[r][v][p] (step 405). p is incremented by 1 (step 406). The value of p is then tested to determine if p<P (step 407).

If p<P, then the value VX[r][v][p] and the value of VY[r][v][p] is again computed (e.g., returns to step 405). If p is not less than P, then v is incremented by 1.

The value of v is then tested to determine if v≦N. If v≦N, then the method returns to step 403. If v is not ≦N, then r is incremented by 1 (step 410).

The value or r is tested to determine if r≦M. If r≦M, then the method returns to step 402. If r is not ≦M, then the method terminates (step 411). The line segments from (VX[r][v][p−1],VY[r][v][p−1]) to (VX[r][v][p],VY[r][v][p]) represent the pieces of the total value function.

In accordance with the exemplary embodiment of the method depicted in FIG. 2, once the total value function is created, the linear program (LP) is formulated, which is solvable by any of several commercially available LP solvers. The intuition for this LP comes from a flow graph composed of nodes and arcs. In certain special cases, the problem will actually be solvable via network flow solvers, which are also available commercially. Consider the flow graph shown in FIG. 5. The flow graph depicted in FIG. 5 includes three types of nodes.

There is a first column (501) of (source) nodes (r,v) (501a-501d) for each retention class r and each vat v for which retention class r is relevant. The nodes are blocked into N+1 groups, one group for the new data and N groups for the actual vats. The group for vat 0 has nodes (501a) for each retention class. The group for vat v has non-trivial nodes (501b-501d) for each retention class r with A[r][v]=1. These nodes introduce Z[r][v] units of flow into the graph.

Furthermore, there is a second column (502) of nodes v, one for each actual vat (502a-502c). There is also a sink node (503) on the right of FIG. 5.

Figure 5:
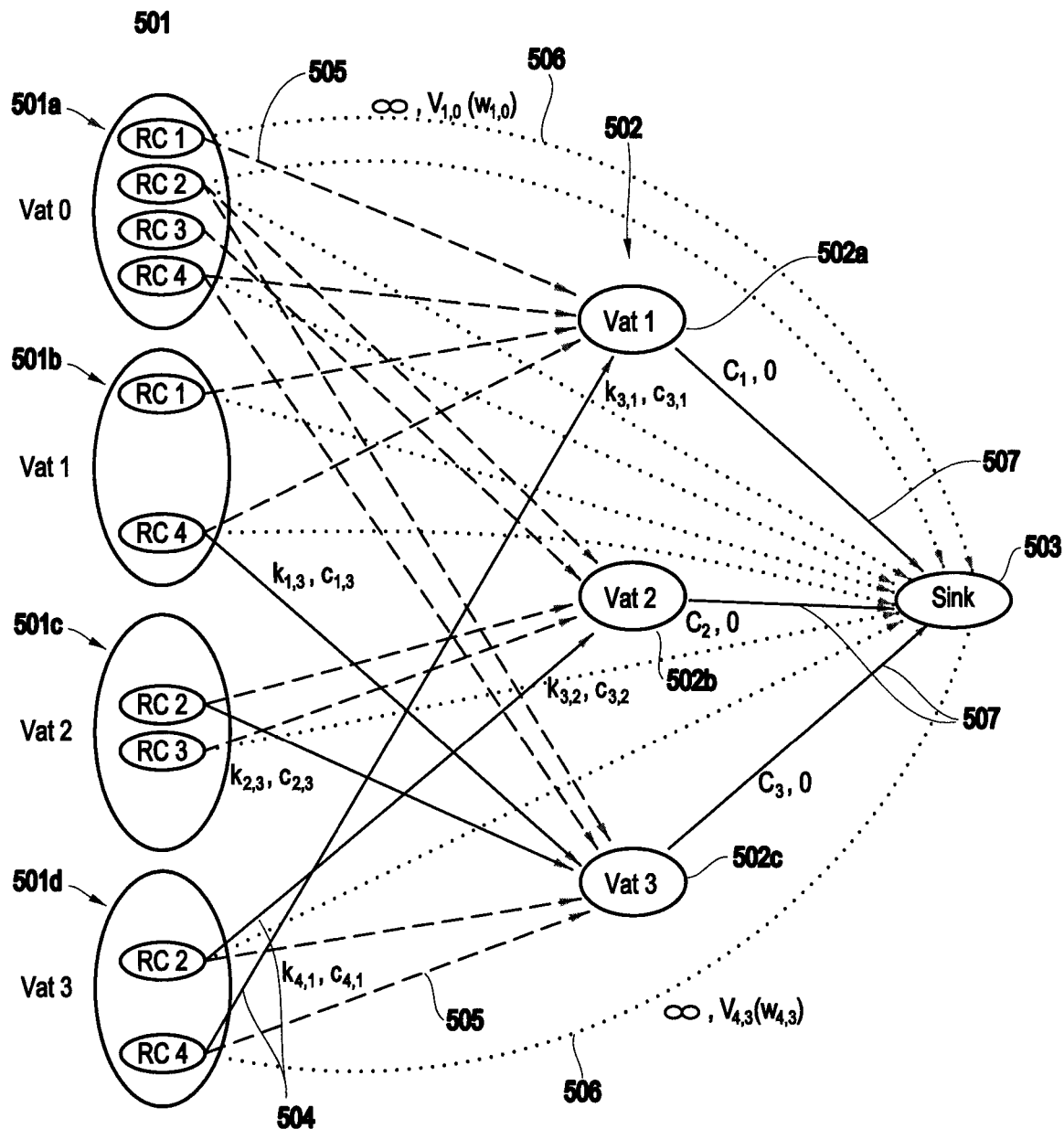
FIG. 5 depicts an exemplary conceptual flow graph 500 for a linear program used in accordance with an exemplary embodiment of the present invention.

As shown in FIG. 5, the nodes (501, 502 and 503) are connected by arcs. There are two types of arcs from the nodes in the first column (501) to the nodes in the second column (502). One type (504) (e.g., the solid arcs in FIG. 5) correspond to movement of data in the retention classes between distinct and actual vats (e.g., from (r,v) to (r,v')). An arc exists only if A[r][v]=A[r][v']=1. The capacity of the arc is defined as k[v][v']. The cost along the arc is defined as c[v][v']. The other type of arcs (505) (e.g., the dashed arcs) correspond to either movement (initial assignment) from vat 0, or to leaving existing data for a retention class on the same vat. In the first case v=0, and in the second case v=v'. Again, an arc from retention class r of vat 0 to vat v exists only if A[v][r]=1. The cost along these arcs is 0 and the capacity is infinite.

There is an additional type of arc (506) (e.g., the dotted arcs in FIG. 5) from nodes in the first column (501) to the sink node (503). An arc from node (r,0) to the sink node (503) corresponds to deleting new data belonging to retention class r, while an arc from node (r,v) to the sink node corresponds to deleting existing retention class r data from vat v. The capacity of an arc from (r,v) to the sink is infinite. The cost along this arc is V[r][v].

Furthermore, there is an additional type of arc (507) from nodes in the second column (502) (e.g., solid arcs in FIG. 5) to the sink node (503). These arcs (507) represent retaining data in the vat. The capacity of the arc from vat v is C[v]. The cost along this arc is 0.

The LP solver may use many (e.g., in an exemplary embodiment, three) types of decision variables. First, y[r][v][v'] is the amount of data from retention class r that will be moved from vat v to vat v'. This data will be retained, and represents the flow from a node in the first column (501) of FIG. 5 to a node in the second column (502). Second, w[r][v] is the amount of new or existing data from retention class r that will be deleted from vat v. This represents flow from the first column (501) of FIG. 5 to the sink (503). γ is a bound on the degree to which load balancing goals cannot be achieved.

The optimization formulation, which can be submitted to any commercially available LP solver, is as follows:

Minimize α (sum over r,v of V[r][v](w[r][v])+sum over v sum over v'c[v][v'] sum over r of y[r][v][v'])+(1−α) γ subject to the following:
1. w[r][v]+sum over v':A[r][v']=1} of y[r][v][v']=Z[r][v] for all (r,v);
2. sum over r:A[r][v]=A[r][v']=1 sum over v' of y[r][v'][v]=C[v] for all;
3. sum over r: A[r][v]=1 of y[r][v][v']<=k[v][v'] for all v neq 0, v' neq v;
4. sum over r,v neq 0,v' of y[r][v][v']<=K;
5. sum over r,v' of y[r][v'][v'] d[r]<=γ D[v] for all v; and
6. w[r][v], y[r][v][v'], γ>=0 & for all r,v,v'.

The objective function includes summands for the value of deleted data, for the cost of moving data from vat to vat, and for load balancing. By scaling the cost coefficient c[v][v'] and the constant α, the optimization method can easily vary the importance of value of deleted data relative to the cost of moving data from vat to vat.

Equations 1 represent the flow conservation constraints for the source nodes (r,v) in the first column (501) of FIG. 5. Equations 2 represent the flow conservation constraints for the nodes v in the second column (502). Inequalities 3 represent the local movement constraints, and inequality 4 represents the global movement constraint. Inequality 5 bounds the factor by which the load balancing goals will be missed by γ, and inequalities 6 represent the non-negativity constraints. Constraints 3, 4 and 5 turn the optimization problem into a linear program rather than a network flow problem.

FIG. 6 illustrates a block diagram of a system 600 for optimizing data in a value-based storage system in accordance with an exemplary embodiment of the present invention. The system 600 includes an estimating unit 601, a computing unit 602 and an implementing unit 603. The estimating unit 601 estimates the rates and value functions of data object production during a fixed interval of time (e.g., the epoch E). The computing unit 602 computes the optimal decisions for allocating the new data to the vats, deleting existing data from the vats and moving the existing data from one vat to another. The implementing unit 603 dynamically implements the optimal decisions during the fixed interval of time.

FIG. 7 shows a typical hardware configuration of an information handling/computer system in accordance with the invention that preferably has at least one processor or central processing unit (CPU) 711. The CPUs 711 are interconnected via a system bus 712 to a random access memory (RAM) 714, read-only memory (ROM) 716, input/output adapter (I/O) 718 (for connecting peripheral devices such as disk units 721 and tape drives 740 to the bus 712), user interface adapter 722 (for connecting a keyboard 724, mouse 726, speaker 728, microphone 732, and/or other user interface devices to the bus 712), communication adapter 734 (for connecting an information handling system to a data processing network, the Internet, an Intranet, a personal area network (PAN), etc.), and a display adapter 736 for connecting the bus 712 to a display device 738 and/or printer 739 (e.g., a digital printer or the like).

As shown in FIG. 7, in addition to the hardware and process environment described above, a different aspect of the invention includes a computer implemented method of performing the inventive method. As an example, this method may be implemented in the particular hardware environment discussed above.

Such a method may be implemented, for example, by operating a computer, as embodied by a digital data processing apparatus to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 711 and hardware above, to perform the method of the present invention.

This signal-bearing media may include, for example, a RAM (not shown) contained with the CPU 711, as represented by the fast-access storage, for example. Alternatively, the instructions may be contained in another signal-bearing media, such as a magnetic data storage diskette or CD disk 800 (FIG. 8), directly or indirectly accessible by the CPU 711.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc,), or other suitable signal-bearing media including transmission media such as digital and analog and communication links and wireless. In an illustrative embodiment of the invention, the machine-readable instructions may comprise software object code, compiled from a language such as "C", etc.

Additionally, it should also be evident to one of skill in the art, after taking the present application as a whole, that the instructions for the technique described herein can be downloaded through a network interface from a remote storage facility.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A method of storing data in a storage system, comprising:
   optimizing a value of data stored in the storage system, the storage system comprising a plurality of data vats, said optimizing a value comprises:
      estimating a rate and a value function of data object production during a projected interval of time; and
      computing and implementing an optimal decision for allocating new data to a first data vat of the plurality of data vats, moving existing data from at least a second data vat to the first data vat, and deleting existing data from the first data vat, based on an amount of data in each of the plurality of data vats,
   wherein an amount of new data and existing data allocated to the first data vat equals an amount of existing data deleted from the first data vat, and
   wherein said allocating new data, said moving existing data, and said deleting existing data is based on said optimizing and a plurality of constraints describing a maximum amount of allowed movement.

2. The method according to claim 1, wherein said optimal decision is implemented during said projected interval of time.

3. The method according to claim 1, further comprising:
repeating said estimating a rate, said computing an optimal decision and said implementing said optimal decision.

4. The method according to claim 1, wherein said computing an optimal decision comprises:
limiting an amount of said existing data that is moved between the plurality of vats.

5. The method according to claim 1, wherein said computing an optimal decision comprises:
eliminating moving data between said plurality of vats.

6. The method according to claim 1, wherein said storage system comprises a distributed computer system.

7. The method according to claim 1, wherein data input into said storage system comprises streaming data.

8. The method according to claim 2, wherein said implementing comprises automatically allocating new data, deleting existing data and moving existing data.

9. The method according to claim 1, wherein said optimizing comprises maximizing a value of retained data in the storage system.

10. The method according to claim 2, further comprising:
periodically gathering information about data being written and about a state of the storage system; and
revising said optimal decision based on gathered information.

11. The method according to claim 2, wherein said optimal decision comprises maintaining an equal value function in each of said plurality of data vats.

12. A tangible computer-readable storage device embodying a program of machine readable instructions executable by a digital processing apparatus to perform a method of storing data in a storage system, said method comprising:
optimizing a value of data stored in the storage system, the storage system comprising a plurality of data vats, said optimizing a value comprises:
estimating a rate and a value function of data object production during a projected interval of time; and
computing and implementing an optimal decision for allocating new data to a first data vat of the plurality of data vats, moving existing data from at least a second data vat to the first data vat, and deleting existing data from the first data vat, based on an amount of data in each of the plurality of data vats,
wherein an amount of new data and existing data allocated to the first data vat equals an amount of existing data deleted from the first data vat, and
wherein said allocating new data, said moving existing data, and said deleting existing data is based on said optimizing and a plurality of constraints describing a maximum amount of allowed movement.

13. A method of deploying computing infrastructure, comprising integrating computer-readable code into a computing system, wherein the computer readable code in combination with the computing system is capable of performing a method of storing data in a storage system, said method of storing data in a storage system comprising:
optimizing a value of data stored in the storage system, the storage system comprising a plurality of data vats, said optimizing a value comprises:
estimating a rate and a value function of data object production during a projected interval of time; and
computing and implementing an optimal decision for allocating new data to a first data vat of the plurality of data vats, moving existing data from at least a second data vat to the first data vat, and deleting existing data from the first data vat, based on an amount of data in each of the plurality of data vats,
wherein an amount of new data and existing data allocated to the first data vat equals an amount of existing data deleted from the first data vat, and
wherein said allocating new data, said moving existing data, and said deleting existing data is based on said optimizing and a plurality of constraints describing a maximum amount of allowed movement.

14. A storage system, comprising:
a plurality of storage vats; and
a processor including an optimizing unit that optimizes a value of data stored in the storage system, said optimizing unit optimizes the value by:
estimating a rate and a value function of data object production during a projected interval of time; and
computing and implementing an optimal decision for allocating new data to a first data vat of the plurality of data vats, moving existing data from at least a second data vat to the first data vat, and deleting existing data from the first data vat, based on an amount of data in each of the plurality of data vats,
wherein an amount of new data and existing data allocated to the first data vat equals an amount of existing data deleted from the first data vat, and
wherein said allocating new data, said moving existing data, and said deleting existing data is based on said optimizing and a plurality of constraints describing a maximum amount of allowed movement.

* * * * *